(12) United States Patent
Sturt et al.

(10) Patent No.: US 6,971,703 B2
(45) Date of Patent: Dec. 6, 2005

(54) ERASABLE MESSAGE BOARD FOR A VEHICLE

(75) Inventors: Alan Sturt, West Bloomfield, MI (US); Lisa Tucci, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/708,252

(22) Filed: Feb. 19, 2004

(65) Prior Publication Data

US 2005/0184552 A1 Aug. 25, 2005

(51) Int. Cl.$^7$ ................................................. B60J 3/00
(52) U.S. Cl. ...................... 296/97.5; 434/410; 434/408
(58) Field of Search .................. 296/97.5; 178/18, 178/18.03, 18.01; 235/380; 40/591, 593, 40/594, 600; 340/461, 468; 365/218; 434/140, 434/408, 169; 283/94; 33/18.1; 349/12, 174; 428/13

(56) References Cited

U.S. PATENT DOCUMENTS

| | | | | |
|---|---|---|---|---|
| 1,455,579 A | * | 5/1923 | Evans ........................ | 434/410 |
| 1,631,192 A | * | 6/1927 | Dunlap ...................... | 434/410 |
| 1,757,287 A | * | 5/1930 | Bildstein .................... | 434/408 |
| 2,697,884 A | * | 12/1954 | Dechert ...................... | 434/410 |
| 2,879,608 A | * | 3/1959 | Watkins ...................... | 434/410 |
| 3,149,425 A | * | 9/1964 | Barish ........................ | 434/410 |
| 3,149,426 A | * | 9/1964 | Kaeyer ........................ | 434/410 |
| 3,405,460 A | * | 10/1968 | Michaelson .................. | 434/410 |
| 3,512,273 A | * | 5/1970 | Baker, Jr. et al. ........... | 434/410 |
| 3,943,643 A | * | 3/1976 | Fisher et al. ................ | 434/410 |
| 4,801,266 A | * | 1/1989 | Kinberg ...................... | 434/410 |
| 4,814,760 A | * | 3/1989 | Johnston et al. ........... | 178/18.01 |
| 4,927,748 A | * | 5/1990 | Kinberg ...................... | 434/410 |
| 4,949,466 A | * | 8/1990 | Auer et al. .................. | 33/18.1 |
| 4,983,951 A | * | 1/1991 | Igarashi et al. ............. | 340/461 |
| 4,988,301 A | * | 1/1991 | Kinberg ...................... | 434/410 |
| 4,990,900 A | * | 2/1991 | Kikuchi ...................... | 345/174 |
| 5,213,504 A | * | 5/1993 | Lee et al. .................... | 434/408 |
| D339,796 S | * | 9/1993 | Goodner et al. ........... | D14/375 |
| 5,249,969 A | * | 10/1993 | Confalone et al. .......... | 434/410 |
| 5,321,891 A | * | 6/1994 | Arad et al. .................. | 33/18.1 |
| 5,324,202 A | * | 6/1994 | Meyers et al. .............. | 434/410 |
| 5,351,143 A | * | 9/1994 | Sato et al. .................... | 349/12 |
| 5,368,489 A | * | 11/1994 | Confalone et al. .......... | 434/410 |
| 5,372,403 A | | 12/1994 | Puerto | |
| 5,401,916 A | * | 3/1995 | Crooks .................... | 178/18.03 |
| 5,432,496 A | * | 7/1995 | Lin ............................. | 340/461 |
| 5,501,601 A | * | 3/1996 | Todokoro et al. ........... | 434/169 |
| 5,542,589 A | | 8/1996 | McKee | |
| 5,594,562 A | * | 1/1997 | Sato et al. .................... | 349/12 |
| 5,671,686 A | | 9/1997 | Hurley et al. | |

(Continued)

*Primary Examiner*—Kiran B. Patel
(74) *Attorney, Agent, or Firm*—Earl LaFontaine

(57) ABSTRACT

A message board system (10) for a vehicle (14) may include a message board (30) that is configured to be coupled to a vehicle structure (32). The message board (30) has a first layer (70) and a second layer (72). The second layer (72) resides adjacent the first layer (70) and is configured such that a portion of the first layer (70) adheres to the second layer (72) to form an image in response to applied pressure on that portion. The message board system (10) may, as an alternative, include a message board housing (98) also configured to couple a vehicle structure (22). The housing (98) includes multiple cells, each of which having a suspension liquid (108) and magnetic particles (110). The particles (110) are pulled through the suspension liquid (108) in response to an applied magnetic field to form an image.

21 Claims, 4 Drawing Sheets

U.S. PATENT DOCUMENTS 5,914,158 A * 6/1999 McGuiness ................... 428/13
6,067,266 A * 5/2000 Donelan ..................... 365/218
6,113,150 A * 9/2000 Kinberg ....................... 283/94
6,324,777 B1 * 12/2001 Ngan .......................... 40/594
6,326,945 B1   12/2001 Williams, III
6,607,216 B1 *  8/2003 Stenger et al. .............. 434/410

* cited by examiner

ERASABLE MESSAGE BOARD FOR A VEHICLE

BACKGROUND OF INVENTION

The present invention relates to in-vehicle message boards and writing tablets. More particularly, the present invention relates to erasable systems for retaining written messages within a vehicle.

As people spend more time in and conduct business out of their vehicles, it has become more important to have accessible writing materials available for taking notes. Often vehicle operators or occupants of a vehicle have various thoughts or visualize certain concepts and have a desire to capture those thoughts and concepts before they are lost or forgotten. Thus, writing pads, tablets, and desk like mechanisms have been incorporated into vehicles for retaining written messages. The writing mechanisms may be incorporated into vehicle designs or may be in the form of after market products.

Various writing mechanisms have been incorporated into vehicles and have been offered in an after market format. For example, writing tables, which may be adhesively secured within a vehicle, have been primarily offered as after market products. Other writing mechanisms such as tables or desk-type apparatuses have been designed to secure to a center console area of a vehicle. Such designs are generally removable and are secured in a console or armrest. These designs have included collapsible desks, portable desks, and desks attached by various adhesive materials including hook and loop type materials, such as Velcro®. Writing mechanisms have also included non-retractable and retractable tablets contained within center consoles and armrests.

A common drawback with the above-identified writing mechanisms is that a writing utensil, such as a pen or pencil is required for the drafting of a written message. A pen or pencil can be difficult to locate and may not exist or be easily and readily available. Also, the difficulty is magnified if the person that wants to use the mechanism is the operator of the vehicle. In order to locate a writing utensil and/or utilize the mechanism, the vehicle may need to be stopped or parked. This can be time consuming and often aggravating. As a result, the occupant may choose not to pursue searching for a writing utensil or choose not to utilize the writing or recording mechanism.

Other drawbacks with current writing mechanisms are the inability to easily erase or remove written messages and the inability to reuse current writing materials. The above-identified writing mechanisms typically include a pad of paper or the like. In general, the paper needs to be replaced upon use thereof. Although both pen and pencil messages may be erased, this is time-consuming and in general does not leave a clean page for new messages.

Thus, there exists a need for an improved writing mechanism for a vehicle that allows for easy and readily accessible use, as well as one that is reusable, that has the capability to retain messages for extended periods of time, and that allows for quick and easy erasure or removal of the messages.

SUMMARY OF INVENTION

The present invention provides a message board system for a vehicle. The message board system may include a message board that is configured to be coupled to a vehicle structure. The message board has a first layer and a second layer. The second layer resides adjacent the first layer and is configured such that a portion of the first layer adheres to the second layer to form an image in response to applied pressure on that portion.

The message board system may, as an alternative, include a message board housing also configured to be coupled to a vehicle structure. The housing includes multiple cells, each having a suspension liquid and magnetic particles. The particles are pulled through the suspension liquid in response to an applied magnetic field to form an image.

The embodiments of the present invention provide several advantages. One advantage is the provision of a message board that is quickly and easily erasable.

Another advantage provided by an embodiment of the present invention is that it provides the provision of a message board that does not require the use of a writing utensil to draft, draw, or create a message or image. Furthermore, the present invention is versatile in that it may be applied to various lock assemblies and ignition systems.

Moreover It is yet another advantage of an embodiment of the present invention to provide a message board that is incorporated into a vehicle structure and is easily and readily accessible.

Furthermore, another advantage provided by an embodiment of the present invention is a message board that resides within a visor and is exchangeable with a mirror.

The present invention itself, together with further objects and attendant advantages, will be best understood by reference to the following detailed description, taken in conjunction with the accompanying drawing.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

Figure 1:
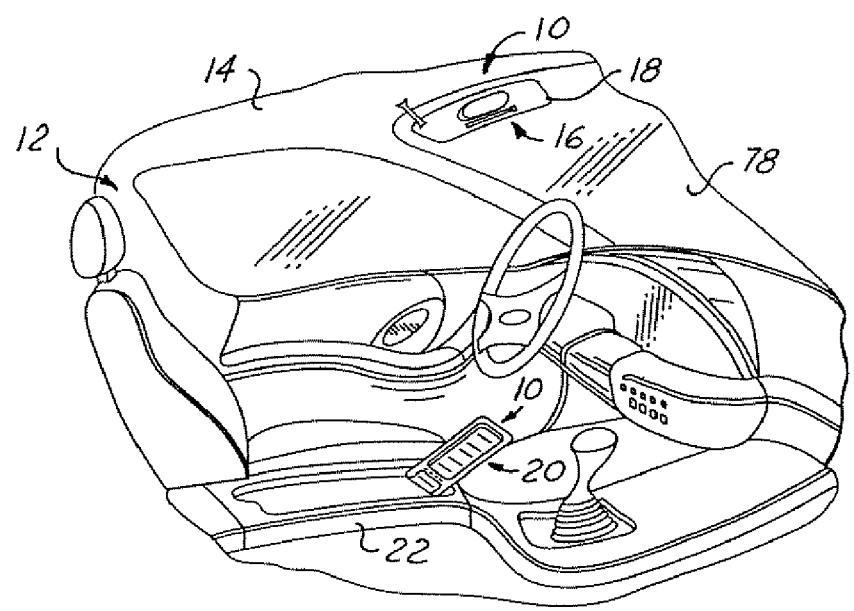
FIG. 1 is a perspective view of message board systems incorporated within an interior cabin of a vehicle in accordance with embodiments of the present invention.

In the following Figures the same reference numerals will be used to refer to the same components. While the present invention is described primarily with respect to erasable systems for retaining written messages within a vehicle, the present invention may be adapted and applied in various vehicle and non-vehicle applications. The present invention may be applied to visors, dashboards, consoles, such as center and overhead consoles, glove boxes, door assemblies, arm rests, and other various vehicle structures.

In the following description, various operating parameters and components are described for one constructed embodiment. These specific parameters and components are included as examples and are not meant to be limiting.

Also, in the following description the term "vehicle structure" may refer to various components or panels of a vehicle. A vehicle structure may refer to a visor, a door panel or component, a console panel or component, a console, a dashboard, an armrest, or other vehicle structures known in the art.

Referring now to FIG. 1, a perspective view of multiple message board systems 10 incorporated within an interior cabin 12 of a vehicle 14 and in accordance with an embodiment of the present invention is shown. The erasable message board systems 10 are shown for example purposes only. Any number of message board systems may be utilized and they may be located in various locations about the vehicle 14, some of which are stated above. A first erasable message board system 16 is configured to mount within an overhead sun visor 18. A second erasable message board system 20 is configured to mount on a center console 22. The first system 16 is described in greater detail below with respect to the embodiments of FIGS. 2A–E. The second system 20 is described in greater detail below with respect to the embodiments of FIGS. 4A–4B.

Referring now to FIGS. 2A–D, elevational views of the first system 16 in accordance with an embodiment of the present invention are shown. The first system 16 includes an erasable message board 30 that is configured to be coupled to a vehicle structure 32, such as a sun visor 18. The message board 30 is shown in the form of a pressure sensitive writing tablet. The message board 30 is configured for installation into the structure 32, which is in the form of a visor, to allow for convenient use thereof. The first system 16 also includes an exchange mechanism 34 and an eraser member 36. The exchange mechanism 34 is used to switch or exchange between the message board 30 and the mirror 38. The eraser member 36 is utilized to quickly and easily erase a message or image, in part or in whole, on the message board 30. Although the eraser member 36 is shown as a single unit, the eraser member 36 may be in multiple units such that segments of the message board may be erased without erasure of other segments.

The exchange mechanism 34 includes an exchange device 40, such as an exchange tab, as shown, and one or more tracks or slide rails 42. A vehicle occupant may switch between viewing the message board 30 and the mirror 38 by sliding the exchange device 40 between a mirror retracted or first position 44, at a first end 46 of the structure 32, and a fully viewable or second position 48, at a second end 50 of the structure 32. When actuated or slid between the first end 46 and the second end 50, the exchange device 40 adjusts position or orientation of the message board 30, the mirror 38, or combination thereof, such that either the message board 30 or the mirror 38 is in a "forefront" position. The forefront position refers to a position of an object at which the object can be viewed and utilized by a vehicle occupant. Other objects may be positioned behind the object that is in the forefront position.

Figure 2E:
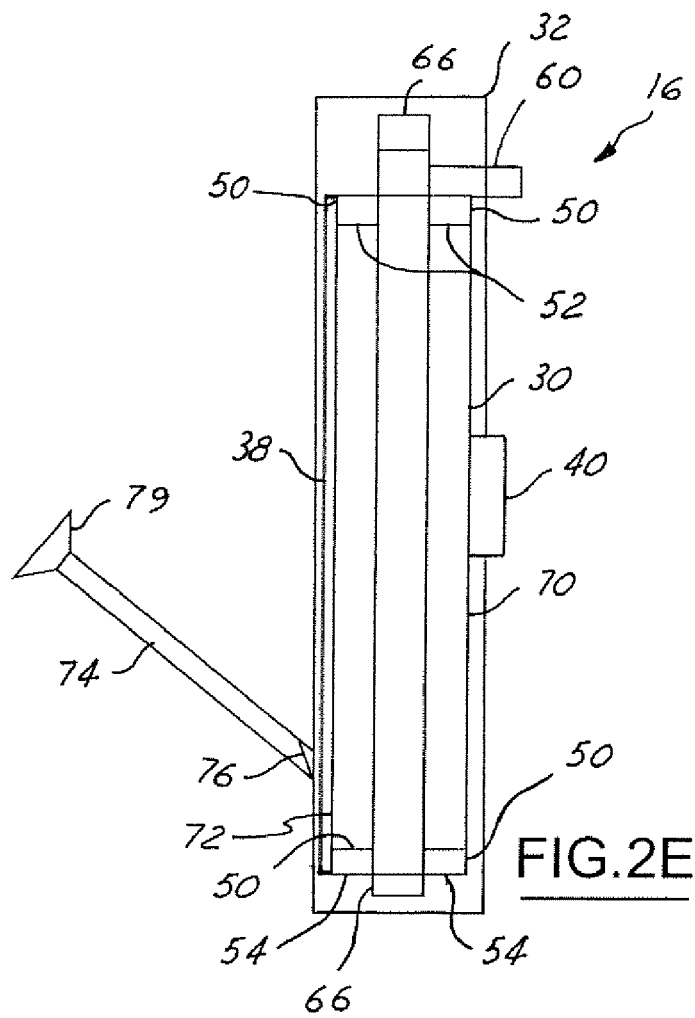
FIG. 2E is a cross-sectional view of the erasable message board system similar to that of FIG. 2A in accordance with another embodiment of the present invention.
Figure 2A:
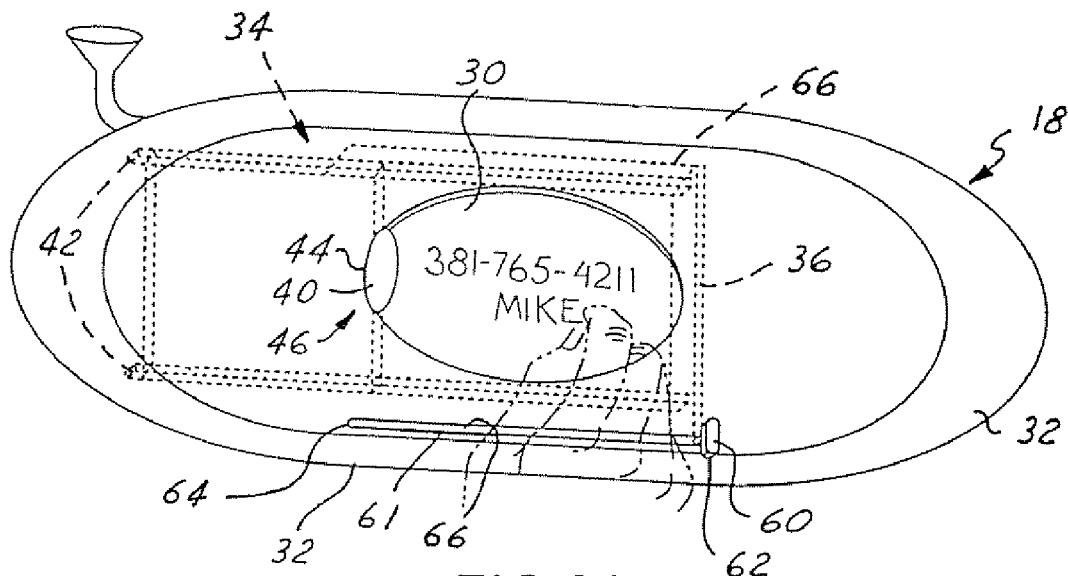
FIG. 2A is an elevational view of a visor of a vehicle incorporating an erasable message board system in accordance with an embodiment of the present invention.
Figure 2B:
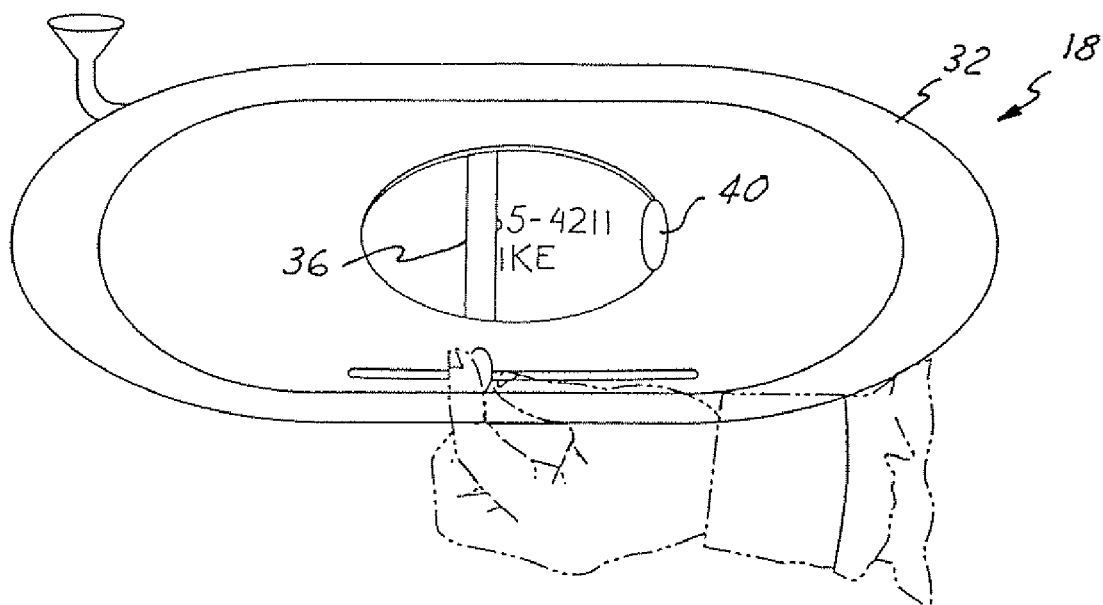
FIG. 2B is an elevational view of the visor of FIG. 2A illustrating the use of a eraser member in accordance with an embodiment of the present invention.

Referring now to FIG. 2E, a cross-sectional side view of the first system 16 in accordance with another embodiment of the present invention. The exchange device 40 may be coupled to a side of the message board 30 and when actuated, may slide the message board 30 over the mirror 38, the mirror 38 being fixed in position relative to the structure 32. In this first example configuration the message board 30 may reside on two pairs of slide rails 50. Each pair of rails 50 has a top slide rail 52 and a bottom slide rail 54.

Referring again to FIG. 2A, the exchange device 40 may be coupled to a side of the mirror 38 and when actuated, may slide the mirror 38 over the message board 30, the message board 30 being fixed in position relative to the structure 32. In this second example configuration the mirror 38 may as an alternative reside on the pair of slide rails 42, as shown.

Figure 2C:
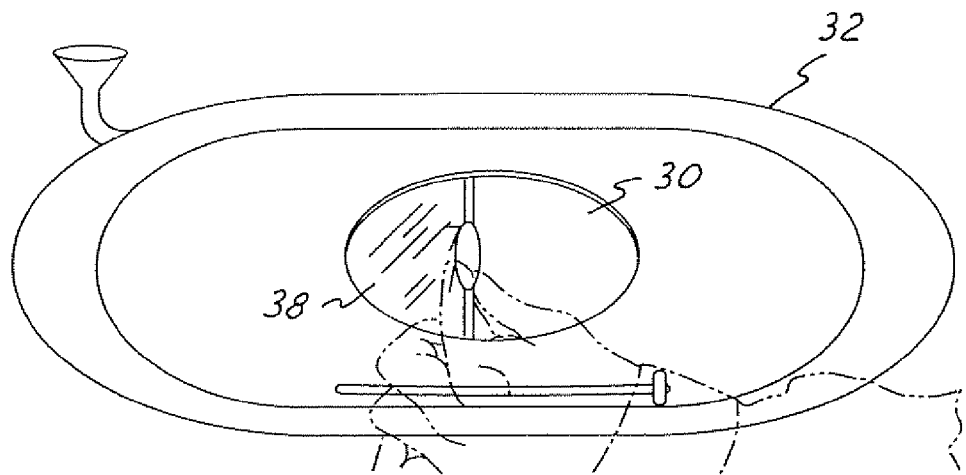
FIG. 2C is an elevational view of the visor of FIG. 2A illustrating the exchange between the erasable message board and a mirror of the visor in accordance with an embodiment of the present invention.
Figure 2D:
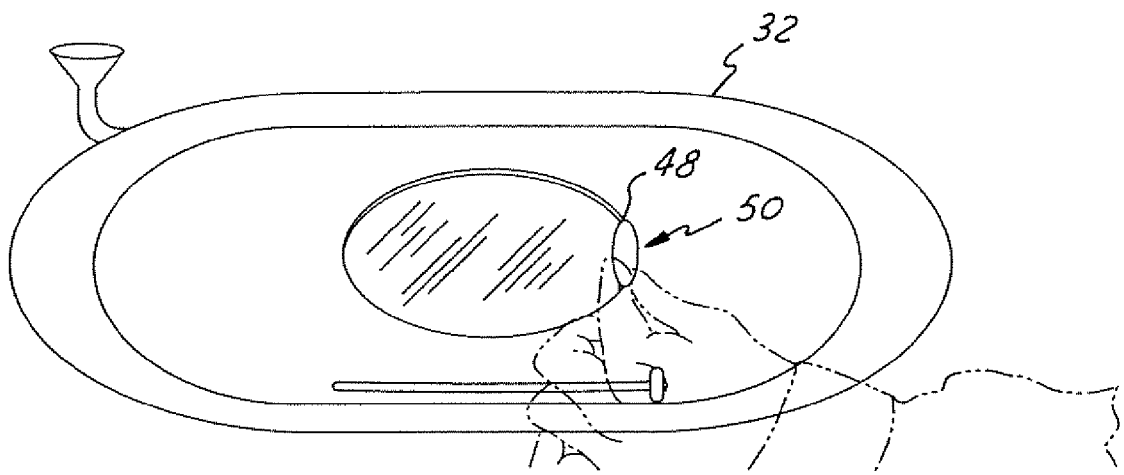
FIG. 2D is an elevational view of the visor of FIG. 2A illustrating the mirror in a forefront orientation in accordance with an embodiment of the present invention.

Referring now to FIG. 2C, as another example, the exchange device 40 may be coupled between the message board 30 and the mirror 38, such that when actuated, the exchange device 40 simultaneously slides both the message board 30 and the mirror 38 in a left or right direction relative to the structure 32. In this third example configuration, the message board 30 and the mirror 38 may also reside on associated pairs of slide rails (not shown), similar to that shown in FIGS. 2A and 2E.

The eraser member 36 may also be in the form of a sliding mechanism. The eraser member 36 may be coupled to an eraser tab 60 through a slot 61 in the structure 32, as shown, and be slid between a first position 62 and a second position 64 on an associated pair of slide rails 66. The eraser member 36 is positioned between a first layer 70 and a second layer 72 of the message board 30, which are best seen in FIG. 2E. In use, the eraser member 36 is slid between the positions 62 and 64 and between the layers 70 and 72 to separate and unadhere the first layer 70 from the second layer 72. Although the eraser tab 60 and slot 61 are shown as being located below the message board 30, they may be located above or to the side of the message board 30.

Although the above-described slide rail configurations are shown utilizing one or more pairs of slide rails, any number of rails may be utilized including single rail configurations. The message board 30 and the rails 42 may also use guides, bearings, or other devices known in the art to provide smooth transitioning of the message board 30, the eraser member 36, and the mirror 38.

Referring again to FIG. 2E, the message board 30 includes the first layer 70 and the second layer 72. The first layer 70 may be formed of a mylar-type material, a vinyl-type material, another similar or suitable material that allows for repetitive use thereof, or a combination thereof. The second layer 72 may be formed of a wax or resin-type material, a vinyl or polymer material, a urethane composite material, or other similar material that allows for repetitive adhesion and separation with the first layer 70, or a combination thereof. The materials may be elastomeric or non-elastomeric.

The materials of the first layer 70 and the second layer 72 are selected to allow for repetitive adhesion and separation therebetween. In one embodiment of the present invention, the first layer 70 is formed of a mylar-type material and the second layer 72 is formed of either a resin-type material or of a urethane composite material. In another embodiment, the first layer 70 is formed of a vinyl-type material and the second layer 72 is formed of a polymer type material.

An occupant of the vehicle 14 may draft a message or draw an image on the message board 30 by simply applying pressure in desired locations on the first layer 70. No writing utensil, such as a pen, pencil, or stylus is needed. The occupant may for example, use a fingernail, a coin, a paper clip, or other object to prepare an image. An operator may also use a non-writing end of a writing utensil, such as a plastic tip, an eraser, a plastic cap, or various other objects.

The system 10 may also include other components to aid in the support of the visor 18, such as a support member 74 having a hinge 76 that may be used to separate the visor 18 from the windshield 78. The support member 74 aids in holding the visor 18 in a vertical position or position that is suitable for the drafting of a message. The support member may have a suction cup 79, as shown or other windshield coupling member known in the art. For example, the suction cup 79 may be replaced with a pad for soft contact with the windshield 78.

Figure 3:
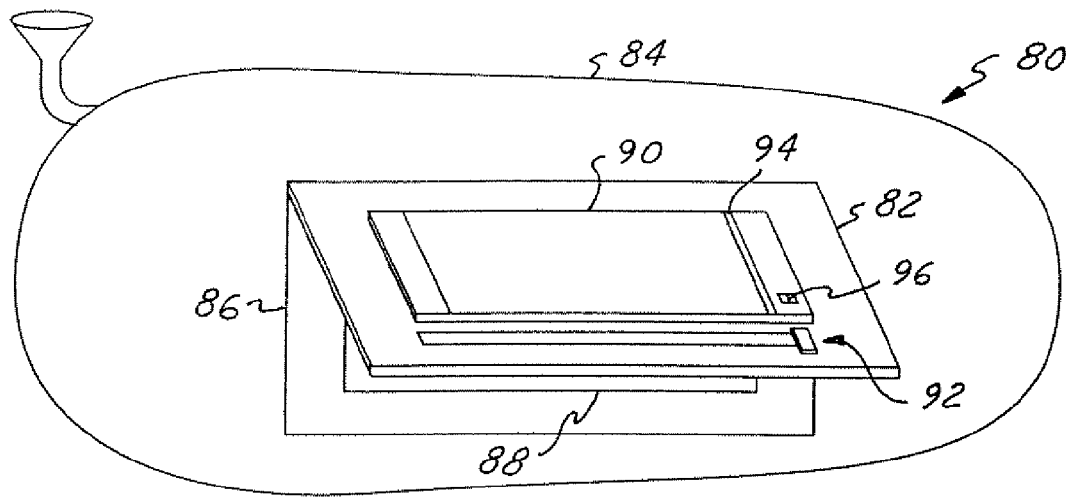
FIG. 3 is an elevational view of an erasable message board system configured for a mirror door in accordance with another embodiment of the present invention.

Referring now to FIG. 3, an occupant side view of an alternative erasable message board system 80 configured for a mirror door 82 and in accordance with another embodiment of the present invention is shown. The erasable message board system 80 is similar to the first system 16 in that it is configured for a windshield visor 84. On the other hand, the erasable message board system 80 is unlike the first system 16 in that instead of being coupled within a visor it is coupled within a mirror door of a visor. The mirror door 82 performs as an exchange mechanism to switch between viewing the message board housing 98 and the mirror 88.

The erasable message board system 80 includes a mirror structure 86 that has the mirror or access door 82 and a mirror 88. The access door 82 may be raised to view the mirror 88 when the visor 84 is in a down position. A message board 90, similar to the message board 30, is incorporated into the door 82 and also includes an eraser mechanism 92. The message board 90 is viewable when the door 82 is in a closed position and the visor 84 is in the down position.

The erasable message board system 80 may include illumination devices 94 (only one is shown) and a switch 96 to power ON the illumination devices 94. The devices 94 may be in the form of light emitting diodes (LEDs), light bulbs, or other illumination devices known in the art.

Figure 4A:
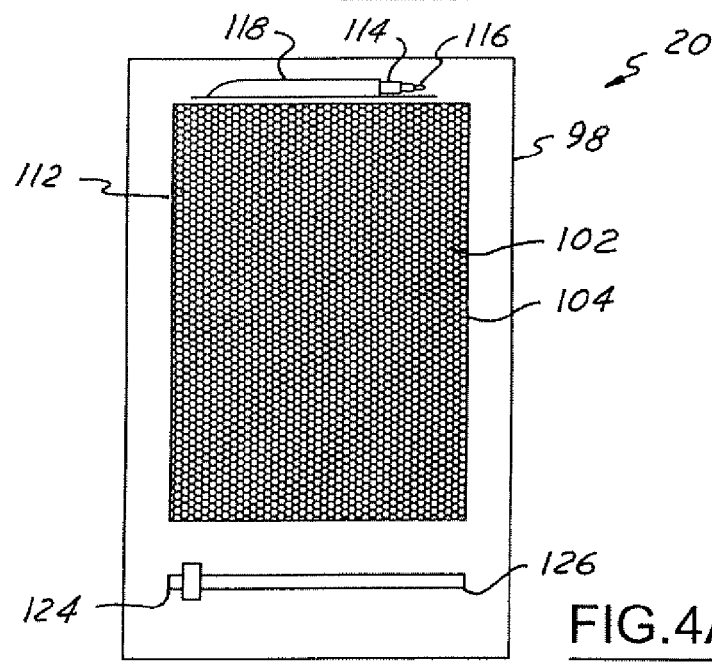
FIG. 4A is an elevational view of an erasable message board system in accordance with still another embodiment of the present invention.
Figure 4B:
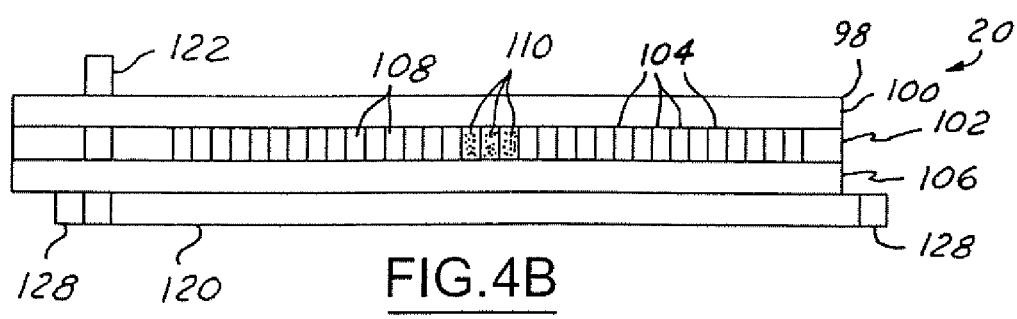
FIG. 4B is a cross-sectional view of the erasable message board system of FIG. 4A.

Referring now to FIGS. 4A–4B, an elevational view and a cross-sectional view of the second system 20 are shown in accordance with another embodiment of the present invention. The second system 20 includes a message board housing 98 configured to be couple to a vehicle structure, such as the console 22.

The message board housing 98 includes a first layer 100, a second layer 102 having multiple cells 104, and a third layer 106. The first layer 100 and the third layer 106 are similar and serve to seal the cells 104. The first layer 100 and the third layer 106 may be formed of a plastic-based material or other suitable material known in the art. The second layer 102 may be in the form of a honeycomb membrane, as shown, or may be in various other forms. For example, the cells 104 may be formed through incremental adhesion of the third layer 106 to the first layer 100, such that the cells are in the form of pockets (not shown). The cells 104 are filled with a suspension liquid 108, which may be a highly viscous material. Magnetic particles 110, such as ion filings, are suspended within the suspension liquid 108.

In use, as an externally applied magnetic field is passed across the second layer 102 the magnetic particles 110 are pulled through the suspension liquid 108 in the cells 106 within the magnetic field to form a message or image that may be viewed on the message board housing 98 in a display area 112. The magnetic field may be created through the use of a stylus 114 having a magnetic tip 116. The message board housing 98 may include a pocket or holder 118 for the stylus 114. The holder 118 allows for quick and easy finding and use of the stylus 114.

The second system 20 may also have an eraser member 120 for erasing or removal of a message or image in the display area 112. The eraser member 120 may also be in the form of a sliding mechanism. The eraser member 120 may be coupled to an eraser tab 122, as shown, and be slid between a first position 124 and a second position 126 on an associated pair of slide rails 128. The eraser member 120 is magnetized and pulls the particles 110 away from the first layer 100 and towards the third layer 104 to erase any message or image in the area 112. Unlike the eraser member 36, the eraser member 120 is positioned behind the message board housing 98. The eraser member 36 is positioned behind the message board housing 98 when the housing is in a forefront position. When the housing 98 is exchangeable with a mirror or other device (not shown), the eraser member 120 may be positioned behind the message board housing 98, between the message board housing 98 and the device, or behind both the message board 98 and the device.

The present invention provides multiple erasable message board systems that may be utilized in various locations within a vehicle. The message board systems allow for quick, convenient, and easy access and use of a message board without necessarily the need for a writing utensil. The message boards do not require replacement-writing pads, such as paper writing tablet type systems.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A message board system for a vehicle comprising:
   a message board integrally formed as part of and at least partially contained within a vehicle structure comprising;
   a first layer; and
   a second layer residing adjacent said first layer and configured such that at least a portion of said first layer adheres to said second layer to form an image in response to applied handwritten pressure on said first layer.

2. A system as in claim 1 further comprising an eraser member residing between said first layer and said second layer.

3. A system as in claim 2 wherein said eraser member separates said first layer from said second layer upon passing said eraser member across said message board.

4. A system as in claim 1 wherein said vehicle structure is selected from at least one of a visor, a console, a door, an instrument panel, a dashboard, and an arm rest.

5. A system as in claim 1 further comprising a mirror coupled to said vehicle structure and operative relative to said message board.

6. A system as in claim 5 wherein said mirror is exchangeable with said message board to be in a forefront orientation.

7. A system as in claim 6 wherein said message board covers at least a portion of said mirror when in said forefront orientation.

8. A system as in claim 6 wherein said mirror covers at least a portion of said message board when in said forefront orientation.

9. A system as in claim 5 wherein said message board is actuatable relative to said vehicle structure.

10. A system as in claim 5 wherein said mirror is actuatable relative to said vehicle structure.

11. A system as in claim 5 further comprising at least one guide rail, said message board and said mirror actuatable relative to each other on said at least one guide rail.

12. A system as in claim 11 wherein said at least one guide rail is contained within said vehicle structure.

13. A system as in claim 1 wherein said first layer comprises a material selected from at least one of a wax, a resin-type material, a vinyl, a polymer, an elastomeric material, a non-elastomeric material, and a urethane composite material.

14. A system as in claim 1 wherein said second layer is selected from at least one of a mylar-type material or a vinyl-type material.

15. A system as in claim 1 wherein said vehicle structure has a deployed state and a stowed state.

16. A system as in claim 15 wherein said message board is viewable when said vehicle structure is in said deployed state.

17. A system as in claim 2 further comprising at least one guide rail, said eraser member actuatable on said at least one guide rail.

18. A visor for a vehicle comprising:
   a message board contained at least partially within the visor and comprising;
   a first layer; and
   a second layer residing adjacent said first layer and configured such that at least a portion of said first layer adheres to said second layer in response to applied handwritten pressure on said first layer.

19. A system as in claim 18 further comprising a mirror coupled to the visor.

20. A system as in claim 19 further comprising an exchange mechanism actuatable to switch between said message board and said mirror.

21. A system as in claim 20 wherein said exchange mechanism is in the form of a slider.

* * * * *